United States Patent [19]

Creed et al.

[11] Patent Number: 4,706,494
[45] Date of Patent: Nov. 17, 1987

[54] SEAL INTEGRITY TESTING

[75] Inventors: Sherman H. Creed; Danny I. Wang, both of Fresno, Calif.

[73] Assignee: FMC Corporation, Chicago, Ill.

[21] Appl. No.: 855,979

[22] Filed: Apr. 25, 1986

[51] Int. Cl.⁴ ............................................. G01M 3/26
[52] U.S. Cl. ........................................ 73/49.3; 73/52
[58] Field of Search ............... 73/49.3, 49.2, 52, 45.4, 73/40.5 A

[56] References Cited

U.S. PATENT DOCUMENTS

| | | | |
|---|---|---|---|
| 3,091,114 | 5/1963 | Webster | 73/49.3 |
| 3,650,145 | 3/1972 | Nelson | 73/49.3 |
| 3,847,014 | 11/1974 | Misthrz | 73/49.3 |
| 3,918,293 | 11/1985 | Feigel | 73/49.3 |
| 4,024,956 | 5/1977 | Cassidy | 73/49.3 |
| 4,148,213 | 4/1979 | Prakken | 73/45.4 |
| 4,287,581 | 9/1981 | Neale, Sr. | 73/40.5 A |
| 4,510,730 | 4/1985 | Edmundson | 73/49.3 |
| 4,517,827 | 5/1985 | Tapscott | 73/49.3 |

FOREIGN PATENT DOCUMENTS 2059381 4/1981 United Kingdom ................ 73/49.3

Primary Examiner—Stewart J. Levy
Assistant Examiner—Hezron E. Williams
Attorney, Agent, or Firm—A. J. Moore; H. M. Stanley; R. B. Megley

[57] ABSTRACT

Disclosed is an apparatus and method for testing the integrity and acceptability of the seal of a package before or after it has been sterilized by any chosen conventional process which may include heat sterilization of a sealed package, aseptic packaging or irradiation. Testing is accomplished by subjecting the package or container to a controlled external pressure, preferably a linear actuator, sufficient to create a selected level of internal pressure. Any suitable means may be used to determine the rate of pressure change within a selected time interval. Upper and lower limits of pressure change determine whether the seal is acceptable.

13 Claims, 4 Drawing Figures

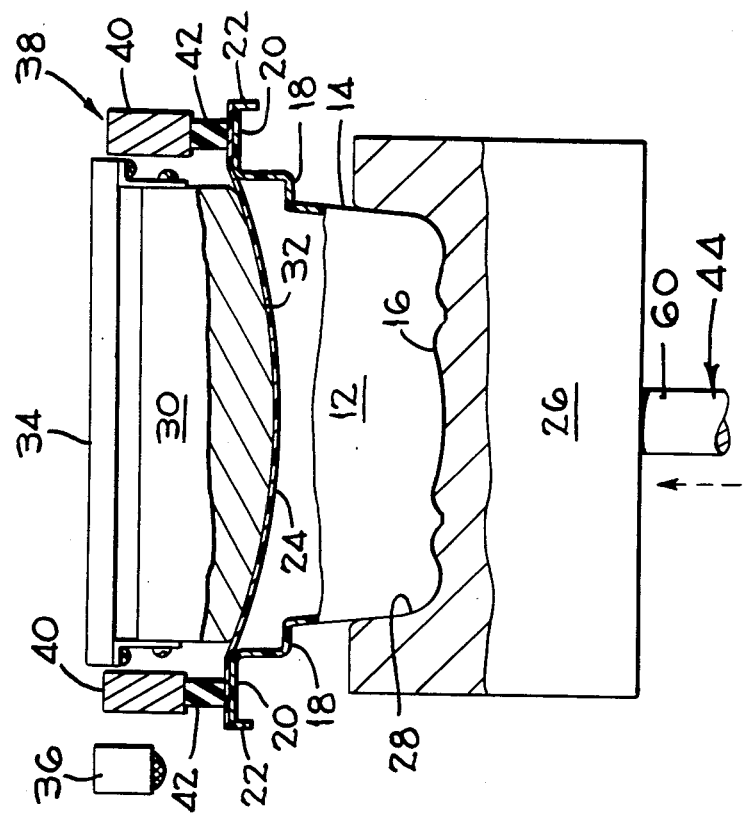
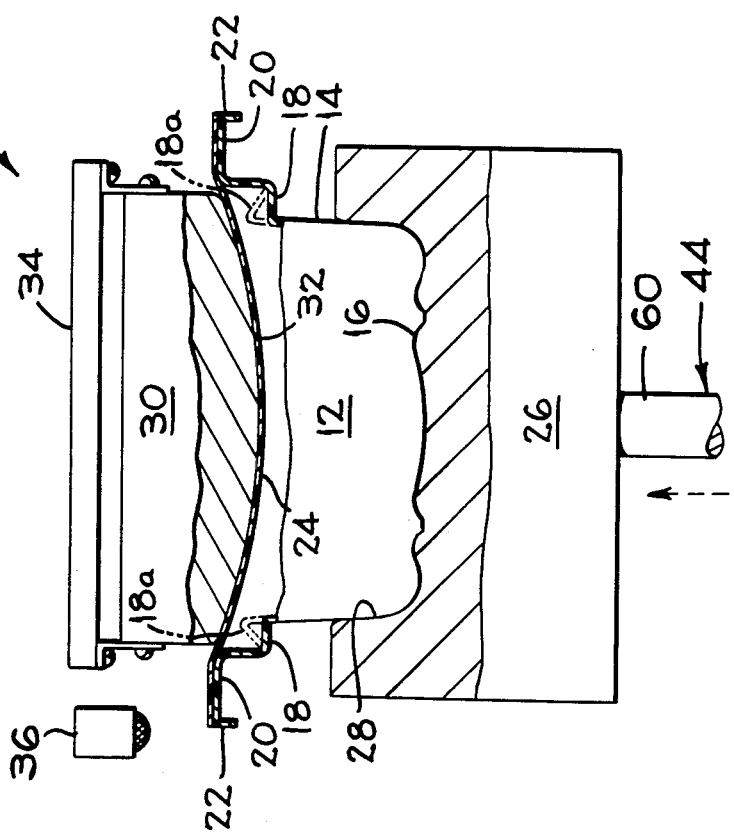

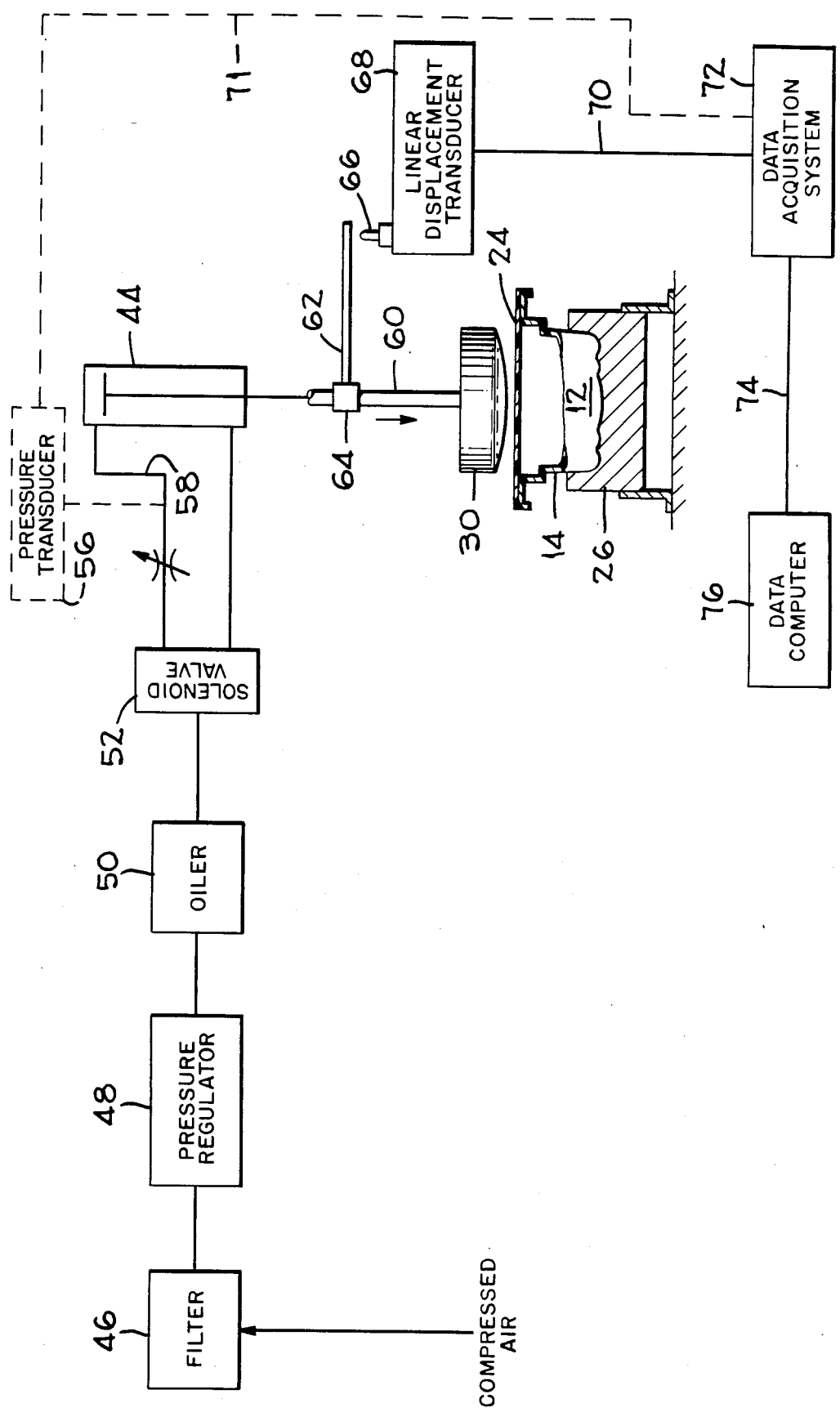
FIG_3

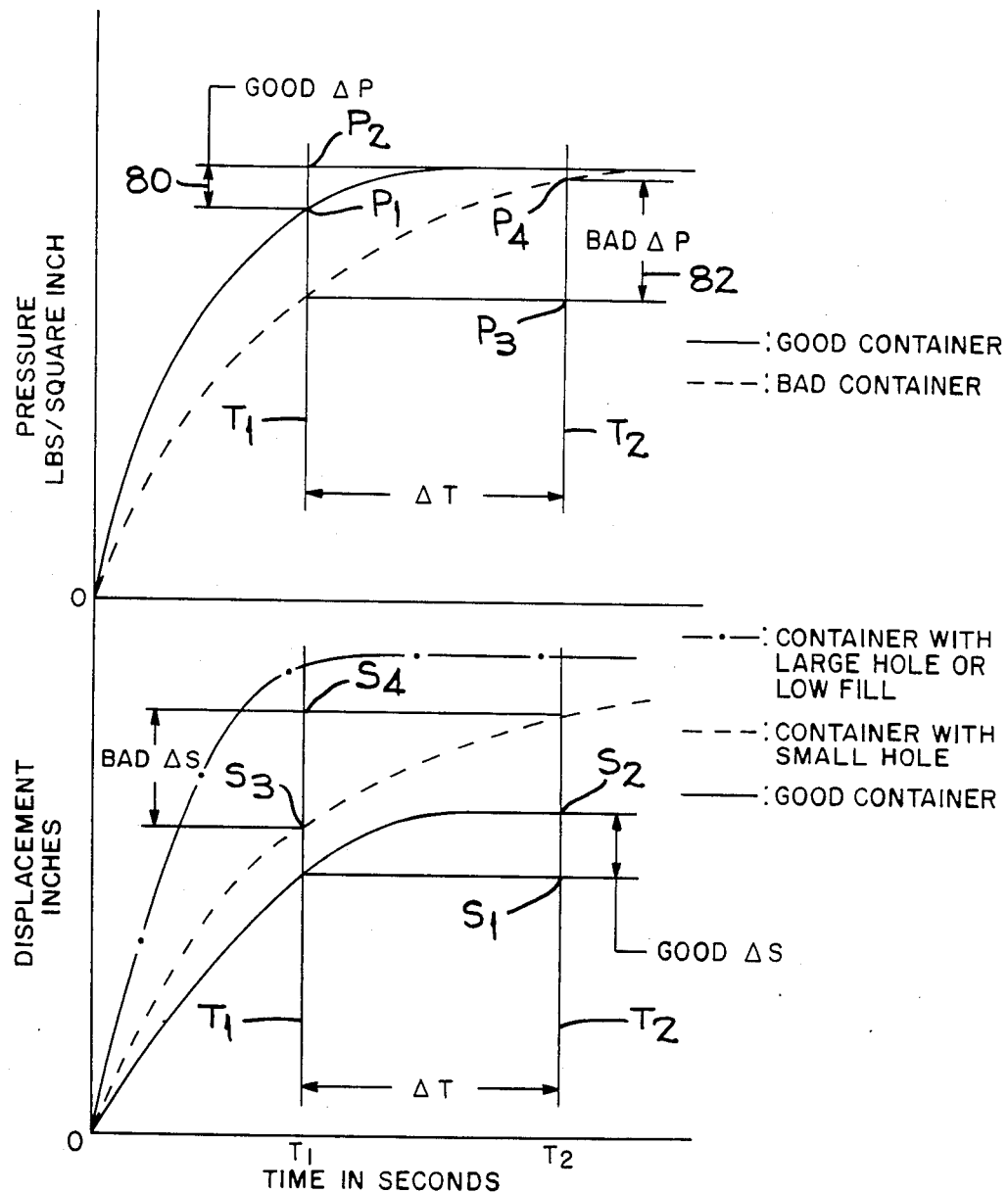
FIG_4

SEAL INTEGRITY TESTING

This invention relates to apparatus and methods for testing seals and more particularly testing seals of food packages or containers.

According to one aspect of the present invention a container or package is received between means for compressing the package so that its internal pressure is increased to a predetermined level while the seal area is substantially free to permit flow of its internal atmosphere externally of the container or package, and means for determining or detecting external flow or the rate of decompression.

According to more particular aspects of the present invention the detecting means may comprise, singly or in combination, means for compressing selected boundary walls to increase the internal pressure of the package or container, means for monitoring the rate at which the compressing means is displaced during the course of compression, means for evaluating and displaying the rate of compression in order to classify the condition of the seal or means for sonically detecting the flow of gas across the seal of the package or container.

BRIEF DESCRIPTION OF THE DRAWINGS

FIG. 1 shows a typical package being compressed between an upper stationary platen and a lower movable platen associated with a microphone for detecting flow of fluid across the package seal, FIG. 2 also shows the package between compressing members associated with a microphone positioned to detect flow of internal package fluid across the sealed covering web, FIG. 3 illustrates a system for evaluating the condition of a package seal by monitoring the rate of movement of one of the compressing platens, and FIG. 4 shows typical graphs comparing changes in pressure and displacement for a selected time interval.

DESCRIPTION OF ILLUSTRATED EMBODIMENTS

The seal integrity testing arrangement shown in FIG. 1, generally identified by the numeral 10, is shown associated with a container 12 formed with a deep bowl portion 14. The bottom wall of the bowl may be provided with one or more annular ridges similar to ridge 16 and the upper portion is formed with stepped flanges 18 and 20 with the upper flange 20 being turned to form a lip 22. Secured to the upper flange is a flexible covering web 24 which may be sealed to the flange 20 by heat and pressure and/or an adhesive.

The seal integrity testing device shown in FIG. 1 comprises a lower platen 26 formed with a cavity 28 conforming to the shape of the bowl 14. The container 12 is closed after being filled with a food product by the covering flexible web 24 which overlies flanges 20. An upper die or platen 30 formed with a web contacting convex surface 32 is carried by platen 34 fixed against movement and accordingly holding the upper die 30 stationary.

In accordance of one aspect of the present invention the condition of the seal formed in the area of the flange 20 is determined by providing means for detecting flow of the internal atmosphere of the package externally. One such means may comprise a microphone 36 (also used in the embodiment shown in FIG. 2) located adjacent the flange 20 so that movement of fluid across the seal may be sonically detected. It is to be understood that the microphone is part of an electronic system including an amplifier producing frequencies within the audible range.

With a package 12 inserted into the cavity 28 the lower platen 26 is moved toward the upper platen 34 a distance determined by calibrating the movement of platen 26 to the internal pressure generated by squeezing or displacing the covering web sufficient to impart shearing force to the circumferential seal of the web 24 to the flange 20. One exemplary limit of the squeezing action is represented by elastic deformation (shown in dotted line) of the flange 18 wherein the side walls of the container move upwardly relative to the flange 20 to define a deformation of the flange 18 such that it is inclined, indicated as 18a (FIG. 1), relative to its equilibrium position.

If as a result of package compression the microphone 36 fails to detect high velocity fluid streams, the package is classified as acceptable. It should be appreciated that several microphones, such as microphone 36, can be positioned adjacent the outer periphery of the flange 20 so that irrespective of where the circumferential seal may be impaired the fluid flow from the package will be detected.

The arrangement shown in FIG. 2 is substantially identical to FIG. 1 and accordingly similar parts are identified by the same numeral. The arrangement of FIG. 2 is provided with means 38 overlying the portion of the covering web 24 adjacent the flange 20 for applying pressure to the area of the seal for throttling and accordingly more likely rendering audible escape of the internal package atmosphere across the seal. The throttling means 38 comprises a ring 40 having rigidly mounted therein a circular flexible pad 42, which may be made of rubber or deformable substantially incompressible material. As in the case of the testing unit shown in FIG. 1, testing a container by providing a pad 42 would require calibrating the degree of displacement of the lower platen 26 so that undue bending of the flange 20 does not occur.

Further in accordance with the present invention testing of seal integrity can be achieved by measuring the rate at which tha package or container is elastically deformed or the rate at which pressure in a double acting linear actuator 44 (FIGS. 1-3) varies with respect to a selected time increment. A system adaptable to detect the rate of displacement or the rate at which the pressure in the actuator changes under compression is illustrated in Figure with the piston rod of the actuator 44 being illustrated as being connected to the lower platen 26 in FIGS. 1 and 2 and being connected to the upper platen 30 in the FIG. 3 embodiment. The upper platen 30 is directly connected to a double acting linear actuator 44 which is powered from a source of compressed air which sequentially passes through a filter 46, a pressure regulator 48, an oiler 50 and a valve 52 which may be a manual value operated by a hand lever 54 or a solenoid value to selectively direct pressure air to the head end or rod end of the actuator 44. If it is desired to evaluate the container by observing or recording the rate of change in pressure within a selected time, either a transducer or increment a pressure gage 56 or a transducer may be connectd to the line 58 supplying the head end of the actuator 44 with pressure air.

The rod 60 of the actuator 44 mounts the upper platen 30 (FIG. 3) and a laterally extending rod 62 fixed to a collar 64 which is in turn secured to the rod 60. The laterally extending rod 62 makes contact with an input plunger 66 of a linear displacement transducer 68 having its output through line 70 connected to a data acquisition system 72 which in turn is connected by line 74 to a computer 76. Also, a line 71 is connected between the transducer 56 and the data acquisition system 72.

If it is chosen to operate the seal integrity testing system by measuring the rate of linear displacement, measurement is commenced after the platen 30 makes intimate forceable contact with the covering web 24 initially raising the internal pressure of the container 12. At this point the plunger 66 is actuated by the rod 62 and further movement and the rate thereof of rod 60 is transmitted by the transducer 68 to the data acquisition system 72. The rate of movement data input to 72 is read by the computer 76 which is provided with a program for analyzing the displacement data. A suitable display, such as a CRT, may be incorporated to visually display the computer output. In addition, a suitable diverting system (not shown), such as a gate or a reject conveyor can be coupled to respond in those instances where the computer has determined a package or container has an unacceptable seal.

If it is desired to monitor pressure change a pressure transducer may replace the gauge 56, and the transducer may be connected to detect pressure in the line 58 connecting the head end of the actuator 44 with the source of pressure air. The pressure transducer may be connected to the data acquisition system 72 through line 71 then to the computer 76 through line 74.

FIG. 4 is a composite graph comparing displacement rate and pressure changes over an increment of time delta T although it should be understood that the graphs shown in this figure are merely representative of experimental activity as opposed to use in a commercial installation. The graph plotting pressure against time shows a solid line trace and a dash line trace associated with the legend good container and bad container, respectively. A representative pressure difference for a good container is represented by the vertical line 80 extending between pressures $P_1$ and $P_2$ in legend, good delta P whereas a bad container represented by the vertical line 82 and associated with the legend bad delta P extends between pressures $P_3$ and $P_4$ which are readings between the time increments $T_1$ and $T_2$.

If it is desired to use a linear displacement transducer the representative curves plotting displacement versus time is also shown in FIG. 4. The trace of a chain dotted line indicates a bad container and is legended "CONTAINER WITH LARGE HOLE OR LOW FILL". The trace indicated by the dash line is legended "CONTAINER WITH SMALL HOLE" and the solid line trace is legended "GOOD CONTAINER". Displacement of the rod 60 where the solid line curve (good container) intersects $T_1$ and $T_2$ is the distance between $S_1$ and $S_2$ yielding a change in displacement indicated as GOOD delta S representative of a good container; whereas the dash line curve, intersecting $T_1$ and $T_2$ indicating a displacement between $S_3$ and $S_4$ classifies a container as a bad container delta S unacceptable due to the displacement change between the indicated time limits. A container tracing a curve by the chain dotted line would be a container with a large hold or low fill yielding results of displacement versus time clearly indicating a bad container.

Although the best mode contemplated for carrying out the present invention has been herein shown and described, it will be apparent that modification and variation may be made without departing from what is regarded to be the subject matter of the invention.

What is claimed is:

1. An apparatus for testing the seal integrity of a flexible package containing food products while exposed to ambient atmosphere, said apparatus comprising opposed platens, power means for establishing relative movement between said platens, one of the platens supporting the package, one of said platens being movable toward the other platen by said power means to raise the internal pressure of the package to an initial predetermined level while the seal remains free of compressive forces created by said platens, and means responsive to said power means for applying an additional predetermined higher level of internal pressure to the package during a selected time interval for indicating whether compressed fluids within the package flows past the seal, a large pressure differential in said additional higher level of pressure during said timed interval indicating a leaking condition while a small pressure differential at a higher average pressure during said timed interval indicating a properly sealed container.

2. An apparatus for testing the seal integrity of a flexible package containing food products while the package is in ambient atmosphere surrounding the apparatus, said apparatus comprising opposed platens, power means for establishing relative movement between said platens, one of said platens supporting the package, one of said platens being movable toward the other platen by said power means to raise the internal pressure of the package to a predetermined level while the seal remains free of compressive forces created by said platens, and flow indicating means responsive to the maximum level of internal pressure during a selected time interval for indicating whether flow of compressed fluids in the package through the seal has occurred, fluids within the package out of the package.

3. The testing apparatus according to claim 2 further comprising means in contact with the seal of the package during compression for restricting the flow of fluids across the seal to render the flow sonically detectable.

4. The testing apparatus according to claim 1 wherein movement and the rate thereof during the selected time interval by the moveable platen after the fluid within the package has been compressed is electronically detected and processed to determine the seal integrity.

5. An apparatus for testing the seal integrity of a flexible package containing food products, said apparatus comprising opposed platens, one of said platens supporting the package and movable toward the other platen to raise the internal pressure of this package to a predetermined level while the seal remains free of compressive forces created by said platens, and means responsive to the level of internal pressure during a selected time interval for indicating whether flow of the compressed internal atmosphere of the package through the seal has occurred, maintenance of the internal pressure of the package over a selected time interval being electronically evaluated to determine seal integrity.

6. An apparatus for testing the seal integrity of a flexible container closed by a seal and having a product and fluid packaged therein, comprising:
 means for applying an initial compressive force to the container to increase the internal pressure therein, said means thereafter applying an additional compressive force for a predetermined period of time for providing a higher level of pressure within the container; and means for measuring the changing pressure within the container during said timed period with a small differential of pressure measured during the timed period indicating a properly sealed container, and with a large differential of pressure measured during the timed period indicating fluid leakage from the container.

7. An apparatus according to claim 6 wherein said means for applying said compressive force comprises a first platen having a convex seal engaging surface, a second platen having a cavity therein for receiving a portion of the container therein, and power means operatively connected to one of said platens for applying said initial and additional compressive force to the container.

8. An apparatus according to claim 7 wherein said power means comprises a fluid operated double acting linear actuator connected to one of said platens, a pressure transducer communicating with said linear actuator, a data acquisition system communicating with said pressure transducer, and a data computer communicating with said data acquisition system.

9. An apparatus for testing the seal integrity of flexible container closed by a seal and having a product and fluid packaged therein with the container being positioned between two platens, comprising:

means for establishing an initial relative movement between the platens for applying an initial compressive force to the container to increase the initial pressure therein, and thereafter applying an additional amount of relative movement between the platens for a predetermined period of time for providing a higher level of pressure within the container; and means for measuring the change of distance between the platens during said timed period with a resulting small length differential between the platens indicating a properly sealed container and with a large length differential during the time period indicating a leak in the container.

10. An apparatus according to claim 9 wherein said means for establishing said initial relative movement and said additional relative movement comprising a first platen having a convex seal engaging surface, a second platen having a cavity therein for receiving a portion of the container therein, and power means operatively connected to one of said platens for establishing said initial and said additional relative movement of said platens.

11. An apparatus according to claim 10 wherein said power means comprises a fluid operated double acting linear actuator connected to one of said platens, an arm connected to a movable portion of said actuator, a linear displacement transducer disposed in position to be actuated by said arm after said platens have completed said initial relative movement, a data acquisition system connected to said linear displacement transducer, and a data computer communicating with said data acquisition system.

12. A method for testing the seal integrity of a flexible container closed by a seal and having a product and fluid packaged therein, comprising the steps of:

applying an initial compressive force to the container to increase the initial pressure therein;

thereafter applying an additional compressive force for a predetermined period of time for providing a higher level of pressure within the container; and measuring the changing pressure within the container during said timed period with a small differential of pressure measured during the time period indicating a properly sealed container, and with a large differential of pressure measured during the timed period indicating fluid leakage from the container.

13. A method for testing the seal integrity of a flexible container closed by a seal and having a product and fluid packaged therein with the container being positioned between two platens, comprising the steps of:

establishing an initial relative movement between the platens for applying an initial compressive force to the container to increase the internal pressure therein, and thereafter applying an additional amount of relative movement between the platens for a predetermined period of time for providing a higher level of pressure within the container; and measuring the change of distance between the platens during said timed period with a resulting small length differential between the platens indicating a properly sealed container, and with a large length difference during the time period indicating a leak in the container.

* * * * *